(12) United States Patent
Legeydo et al.

(10) Patent No.: US 8,138,763 B2
(45) Date of Patent: Mar. 20, 2012

(54) METHOD FOR QUANTITATIVE SEPARATION OF ELECTROMAGNETIC INDUCTION AND INDUCED POLARIZATION EFFECTS

(76) Inventors: Petr Yuryevich Legeydo, Irkutsk (RU); Yevgeny Valeryevich Ageyenkov, Irkutsk (RU); Ivan Yuryevich Pesterev, Irkutsk (RU); Sergey Aleksandrovich Ivanov, Irkutsk (RU); Svetlana Yuryevna Garina, Irkutsk (RU); Elena Olegovna Kudriavtseva, Irkutsk (RU); Yury Aleksandrovich Davydenko, Irkutsk (RU)

( * ) Notice: Subject to any disclaimer, the term of this patent is extended or adjusted under 35 U.S.C. 154(b) by 339 days.

(21) Appl. No.: 12/588,507

(22) Filed: Oct. 19, 2009

(65) Prior Publication Data
US 2010/0164500 A1    Jul. 1, 2010

(51) Int. Cl.
*G01V 3/06* (2006.01)
(52) U.S. Cl. .......................... 324/362; 324/323; 324/360

(58) Field of Classification Search .................... None
See application file for complete search history.

(56) References Cited

U.S. PATENT DOCUMENTS

| | | | |
|---|---|---|---|
| 7,396,684 B2 * | 7/2008 | Ehrfeld et al. | 436/164 |
| 2010/0250141 A1 * | 9/2010 | Tompkins | 702/7 |

* cited by examiner

*Primary Examiner* — Jermele M Hollington
*Assistant Examiner* — Trung Nguyen

(57) ABSTRACT

The invention relates to the field of electrical exploration and to the methods of determination of subterranean formations properties by means of electric parameters of subterranean formations measuring and separating of the parameters measured. The invention can be applied both in surface and marine electrical exploration using controlled sources of electromagnetic field, and is used in gas and oil exploration for searching and delimitation of oil and gas reservoirs basing on segregation of response from stratum, secondarily changed due to hydrocarbons migration, to split the measured signal to available components. The invention provides for a set of techniques that enable a layer-by-layer determination of geoelectrical parameters values, as well as process characteristics of induced medium polarization and electromagnetic induction.

9 Claims, 14 Drawing Sheets

| | ρ | | η % | | τ | | c | | h | |
|---|---|---|---|---|---|---|---|---|---|---|
| 1 | 0.26 | 0.62 0.16 | 0.00 | 20.00 0.00 | 0.400 | 3.00 0.10 | 0.699 | 0.90 0.20 | 18.00 | 18.00 18.00 |
| 2 | 9.17 | 20.00 1.00 | 3.64 | 20.00 0.00 | 0.100 | 3.00 0.10 | 0.547 | 0.90 0.20 | 89.03 | 200.00 20.00 |
| 3 | 3.48 | 8.00 1.00 | 0.47 | 20.00 0.00 | 1.811 | 3.00 0.10 | 0.900 | 0.90 0.20 | 205.94 | 400.00 200.00 |
| 4 | 9.38 | 20.00 8.00 | 4.86 | 20.00 0.00 | 1.415 | 3.00 0.10 | 0.899 | 0.90 0.20 | 203.68 | 300.00 100.00 |
| 5 | 4.44 | 8.00 1.00 | 0.00 | | 1.000 | | 0.500 | | 394.51 | 500.00 300.00 |
| 6 | 7.00 | 60.00 7.00 | 0.00 | | 0.100 | | 0.500 | | 2600.00 | 3000.00 2000.00 |
| 7 | 1000.00 | | 0.00 | | 0.100 | | 0.500 | | 3538.17 | 2520.00 2285.00 |

| | ρ | η % | τ | C | h |
|---|---|---|---|---|---|
| 1 | 0.26    0.62<br>0.16 | 0.00  20.00<br>0.00 | 0.400   3.00<br>0.10 | 0.699   0.90<br>0.20 | 18.00   18.00<br>18.00 |
| 2 | 11.21  20.00<br>1.00 | 3.88  20.00<br>0.00 | 0.250 | 0.500 | 55.94   200.00<br>20.00 |
| 3 | 4.6    8.00<br>1.00 | 0.00 | 1.000 | 0.500 | 247.98  400.00<br>200.00 |
| 4 | 8.00   20.00<br>8.00 | 6.69  20.00<br>0.00 | 2.000 | 0.750 | 211.43  300.00<br>100.00 |
| 5 | 4.74   8.00<br>1.00 | 0.00 | 1.000 | 0.500 | 404.82  500.00<br>300.00 |
| 6 | 7.00   60.00<br>7.00 | 0.00 | 0.100 | 0.500 | 2600.00  3000.00<br>2000.00 |
| 7 | 1000.00 | 0.00 | 0.100 | 0.500 | 3535.53 |

METHOD FOR QUANTITATIVE SEPARATION OF ELECTROMAGNETIC INDUCTION AND INDUCED POLARIZATION EFFECTS

BACKGROUND OF THE INVENTION

The invention relates to the field of electrical exploration. The invention relates to the methods of determination of subterranean formations properties by means of electric parameters of subterranean formations measuring and separating of the parameters measured.

The invention can be applied both in surface and marine electrical exploration using controlled sources of electromagnetic field, and is used in gas and oil exploration for searching and delimitation of oil and gas reservoirs basing on segregation of response from stratum, secondarily changed due to hydrocarbons migration, to split the measured signal to available components. The invention provides for a set of techniques that enable a layer-by-layer determination of geoelectrical parameters values, as well as process characteristics of induced medium polarization and electromagnetic induction.

The known invention 'A geoelectrical prospecting method (variants)', Patent RU No. 2235347 published on Aug. 27, 2004, IPC G01V3/06, discloses the way of electromagnetic field inducing in a studied medium by transmitting through it a periodical rectangular pulse sequence with a pause after each pulse. At each current pulse cutoff and between current pulses, during pauses, the momentary values of axial and orthogonal differences of potentials are measured, thus determining potential differences. By solving the inverse problem on a mathematical physics differential wave equation for a dipole source intensity in a polarizable conducting medium, n normalized parameters are calculated following the equation, and the medium model closest to a studied medium in terms of geometrical structure and electric parameters is obtained. According to the electrophysical parameters included in the mentioned equation, time sections of the model are plotted. The method allows detecting and delimitating of oil and gas reservoirs, evaluating of their saturation quality, as well as provides for separation of electrical conduction and induced polarization parameters. Nevertheless the method does not solve the main problem of a quantitative separate studying of the electrical conduction and induced polarization processes, does not consider equivalence of the obtained model electrophysical parameters and can not estimate their informativeness.

The known invention 'Focused current marine geoelectrical prospecting method', Patent RU No. 2284555 published on Sep. 27, 2006, IPC G01V3/06, discloses the way of electromagnetic field inducing in a studied medium, measuring of momentary values of the first and the second differences of electric potentials, ensuring of a condition that the resultant of axial electrical potential difference along the section makes zero, calculating of a coefficient basing on the equation, determining of three multitudes of independent normalized electrical parameters, solving of the inverse mathematical problem to determine three electrophysical parameters (conductivity, induced polarization and a constant of the time of induced polarization potential difference drop), and plotting of three time sections basing on those parameters. The essence of the invention is a separation of electrical conductivity and induced polarization parameters. The invention also permits to determine a constant of the time of induced polarization potential difference drop, which is the third important parameter along with the first two ones. Nevertheless the invention provides for only summarized data of all elements of a studied medium, where the field is developed, since a space distribution of monitored source current I is not controlled in any way, and there is no information on the said distribution in existing three-dimensionally inhomogeneous media. The invention does not solve the main problem of a quantitative separate studying of the electrical conduction and induced polarization processes, does not consider equivalence of the obtained model electrophysical parameters and can not estimate their informativeness.

The known invention 'A geoelectrical prospecting method (variants)', Patent RU No. 2231089 dated Jul. 8, 2003 published on Jun. 20, 2004, IPC G01V3/06, discloses the way of electromagnetic field inducing in a studied medium by transmitting a periodical rectangular pulse sequence with a pause after each pulse, measuring of electrical potentials differences at points of observation using normalized parameters values and following the mathematical physics differential wave equation for a dipole source intensity in an electrochemically polarizable conducting medium, then solving the inverse problem and determining the inherent electrophysical parameters of each element of medium (conductivity, induced polarization and a constant of the time of induced polarization potential difference drop), and plotting three time sections basing on those parameters. The invention allows detecting and delimitation of oil and gas reservoirs and evaluating of their saturation quality. Separation of electrical conduction and induced polarization parameters is provided. But it does not allow a complete separation of inherent to geological medium elements polarization induced by electrical dynamic transients related to electrical conductivity of the said stratum elements that form the section. The invention does not solve the main problem of a quantitative separate studying of the electrical conduction and induced polarization processes, does not consider equivalence of the obtained model electrophysical parameters and can not estimate their informativeness.

The known invention 'A method of geoelectrical prospecting signal analysis', Patent RU No. 2253137 published on Jan. 10, 2005, IPC G01V3/08, discloses simultaneous transforming of each measured signal by at least two modulators, followed by determining of the least intervals. The invention allows increasing of accuracy and informativeness due to a simultaneous analyzing of the signal (regular component) and interference noises (random component). However, the object of the invention is a usage of the method comparing output signals of delta modulators integrators with an output signal of the respective channel with the help of gated comparator. However, the offered method of analysis is feasible only with the use of at least two delta modulators with significantly different quantization steps, system of measuring probes, magnetic field sensors, or any other sensors featuring sufficient broadbandness and spatial angular selectivity (directivity). The method can not be applied for analyzing of parameters obtained by use of the processes of induced polarization in prospecting and exploring of oil and gas fields.

The known invention 'A method for estimating of specific electrical resistivity of a geological formation enveloping a wellbore filled by a wellbore fluid', Patent RU No. 2209451 published on Jul. 27, 2003, IPC[7] G01V3/38, discloses obtaining of a set of diagrams, choosing of a modeled section, introducing of additionally modeled sections, repeating of correcting of a modeled section until the difference between a diagram and respective modeled diagram becomes below a selected threshold value, and includes correcting of each modeled section as function of the values ratio. The invention provides an improved method evaluating specific electrical resistivity of a geological formation and considering a wellbore fluid invasion into a formation enveloping the wellbore. However, the invention does not allow detecting and delimitation of oil and gas reservoirs, evaluating of their saturation quality, as well as providing of separation of electrical conduction and induced polarization parameters. Besides, the invention does not solve the main problem of quantitative separate studying of the electrical conduction and induced polarization processes, does not consider the equivalence of the obtained model electrophysical parameters and can not estimate their informativeness.

The most close invention in terms of method of geoelectrical characteristics processing is 'A method for the subterranean formations properties determination', Patent RU No. 2294547 published on Feb. 27, 2007, IPC$^7$ G01V3/38, that discloses developing of a formation parameters model, modeling of electrical properties measurements, comparing of the modeled measurements and the measured electrical properties, determination of physical/petrophysical properties of formation based on various measurements to provide a combined inversion, evaluating of the physical/petrophysical properties of formation using the model and various measurements of electrical properties, as well as use of a unifying model. The invention allows implementation of improved methods of data processing during a drill well sectioning with the use of electricity, and provides more accurate determination of Rt value to evaluate formation characteristics estimating a formation depth and introducing initial information into the inversion scheme, i.e. geometry information stabilizing imprecise problems of "enhancement". However, the invention does not allow detecting and delimitation of oil and gas reservoirs, evaluating of their saturation quality, as well as providing of separation of electrical conduction and induced polarization parameters. Besides, the invention does not solve the main problem of quantitative separate studying of the electrical conduction and induced polarization processes, does not consider the equivalence of the obtained model electrophysical parameters and can not estimate their informativeness. The objective of the invention is to imply a method that includes pure adjustment of medium model by iterative use of inversion and separation of the measured signal to any components does not occur. We offer a method that supposes application of medium model obtained as a result of the inverse problem solving, to split the measured signal $\Delta U(t)$ into the components EM(t) and Ipg(t).

BRIEF SUMMARY OF THE INVENTION

When transmitting electrical current through a medium there appear different effects caused by various physical phenomena. These effects go with electromagnetic induction characterized by induction fields that is defined by wave theory, and with induced polarization caused by electrochemical processes in the medium.

Until now, the problem of splitting these effects has been solved through increasing of the record interval of transients from an initiating pulse in a medium provoking electromagnetic induction and polarization. Meanwhile the longer it took until the moment of measuring, the lesser became the value of electromagnetic induction field, down to negligibly small values. Otherwise when the period to the moment of measuring is decreased, the effect of polarization will not be negligible at initial moments after the pulse. Measurements of conductivity of the platforms featuring significant thickness of sedimentary cover show a slow fading of electromagnetic oscillation due to a high conductivity of sedimentary cover (hundreds and thousands of Siemens). Existence of the problem and absence of its solution is mentioned in Wate's book (see G. Wate. Geoelectrical magnetism. Moscow, Publishing house Nedra, 1987, p. 235).

The technical result of the proposed method appears to be a possibility of solving the main problem of quantitative separate studying of the electrical conduction and induced polarization processes with consideration of the equivalence of the obtained model electrophysical parameters and estimation of their informativeness.

The method offers:
 a quantitative separate determination of intensity of electromagnetic induction and induced direct current polarization fields with inaccuracy 0.5% or less;
 a provision of long time interval of the fields splitting, 1 µs to few seconds, including sections with high conductivity.

The method can be applied since the function $\Delta U$ is always analytical, i.e. continuous, and its derivatives of order two are also continuous. Moreover, electromagnetic induction and induced polarization fields are not additive, since a part of induced polarization (IP) field is generated by inductive current, and vice versa, a part of electromagnetic induction field is caused by induced polarization fields. We shall discuss only the induced polarization created by direct current during its transmitting into medium.

The claimed technical result is ensured by the fact that the method of quantitative separation of electromagnetic induction and induced polarization effects includes:
 measuring of the transient process above a polarizable medium;
 modeling of electromagnetic measurements within a horizontally stratified polarizable medium;
 segregating of an electrodynamic component from transient process;
 segregating of a galvanic component of induced polarization from transient process;
 evaluating of variation of a galvanic component of induced polarization by area and its geological interpretation.

The method is characterized in setting of several input functions dependent on medium parameters and measured on the medium surface, forming of these functions in the way that ensures different manner of their dependence on electromagnetic induction and induced polarization fields, wherein one of these functions, e.g. Ps, is made to increase an electromagnetic induction and induced polarization ratio as compared to DU(t), another, e.g. $P_1$, is made to decrease the electromagnetic induction and induced polarization ratio as compared to DU(t), and one more of these functions, e.g. Dϕ, represents a combination of time and spatial derivatives of the transient field. Further a simultaneous inversion of the input functions is performed, and a geoelectrical model of the section is obtained, meanwhile the number of the medium parameters which characterize induced polarization is deliberately redundant, so that the obtained medium model is not single, but lies within a certain range of equivalence. In the obtained model the polarizability is set to nil for all layers, and through solving a direct problem the electromagnetic induction field (EM) is calculated, simultaneously the wave numbers of the said model are set to nil, and through solving the direct problem the field of the induced polarization (IP) galvanic component is calculated. Besides, a parameter, e.g. $P_1$, is formed as a filter that increases the induced polarization and electrodynamics ratio as compared to $\Delta U(t)$, further $P_1$ is defined as a ratio of the second axial potential difference of the transient field $\Delta 2U(t)$ and the first axial potential difference of the transient field $\Delta U(t)$ under a condition of current cut-off according to the equation $P1(t)=\Delta 2U(t)/\Delta U(t)/_{time\ off}.$ Another way the parameter Ps is formed as a filter that decreases the induced polarization and electrodynamics ratio as compared to $\Delta U(t)$, and further as a ratio of the second axial potential difference of the transient field $\Delta 2U(t)$ and the first axial potential difference of the transient field $\Delta U(t)$ under a condition of switched on current according to the equation $Ps(t)=\Delta 2U(t)/\Delta U(t)|_{time\ on}$. In particular, the parameter $D\phi(t)$ is formed as the difference of the parameters $I_t(t)$ and $P_1(t)$ according to the equation $D\phi(t)=It(t)-P_1(t)$, where $I_t(t)$ is calculated according to the equation $I_t(t)=\Delta_t(\Delta^2 U(t))/\Delta_t(\Delta U(t))$ as the ratio of the time derivatives $\Delta 2U(t)$ and $\Delta U(t)$.

After the input parameters determined at the same measure point are formed, their minimization is performed through inputting of the following parameters to a minimization program:

$DU(t)=\Delta U(t)/\Delta U_0$, where $\Delta U_0$ is a potential difference $\Delta U$, measured during current passing, $P_1(t)=\Delta^2 U(t)/\Delta U(t)$, calculated under a cut-off current condition, $Ps(t)=\Delta^2 U(t)/\Delta U(t)$, calculated under a switched on current condition, $D\phi(t)=I_t(t)-P_1(t)$, where $I_t(t)=\Delta_t(\Delta^2 U(t))/\Delta_t(\Delta U(t))$, followed by performing of their inversion within a horizontally stratified polarizable medium under conditions of the deliberately redundant number of the model geoelectrical parameters describing its polarization properties. At the same time, as a special case, the induced polarization field is determined as a result of solving the direct problem with wave numbers set to nil, and the electromagnetic induction field is determined as a result of solving the direct problem with polarizability set to nil.

When all actions are completed, verification of reproducibility of the solution is performed.

The assigned task of effects splitting requires performing of a few steps.

Step I
1. Setting a few input functions that can be measured and built on the medium surface.
2. The functions are to be constituted in the way that ensures different manner of their dependence on electromagnetic induction and induced polarization. One of them increases the ratio of electromagnetic induction and induced polarization as compared to DU that presents a voltage drop curve, another function decreases the mentioned ratio. These functions represent a combination of the transient field and its spatial derivatives. Besides, one of the functions represents a combination of time and spatial derivatives.

Step II
1. A simultaneous inversion (solve the inverse problem) for all input functions is performed, and a certain model of the section is obtained. The medium parameters are defined layer-by-layer, those are: electrical resistivity $\rho$, polarizability factor $\eta$, relaxation time $\tau$, index of power c. The polarizability factor, relaxation time and index of power are determined basing on Cole-Cole model. The model parameterization according to these parameters is set deliberately redundant, i.e. the solution obtained belongs to a class of equivalent solutions.
2. The polarizability is set to nil for all layers within the obtained model, and through solving the direct problem the electromagnetic induction field EM is calculated.
3. The wave numbers within the same model are also set to nil, and through solving the direct problem the direct current induced polarization field is calculated.

Iteration of actions sequence (from Step II) proves a coincidence of calculated electromagnetic induction EM and induced polarization IP fields with accuracy of the inverse problem solution. The obtained models differ, but the fields coincide.

Furthermore, the induced polarization IP field is a field obtained when solving the direct problem for the given model with the wave numbers set to nil at any point of the section, and the electromagnetic induction EM field is a field obtained when solving the direct problem for the given model with polarizability set to nil at any point of the section.

BRIEF DESCRIPTION OF THE DRAWINGS

The method is illustrated and proved by means of plots and diagrams in the figures.

It illustrates an infinite set of various combinations of induced polarization IP and electromagnetic induction EM fields. For a synthetic model, the drop curve DU has been calculated and its inversion has been performed twice from different zero-order approximations with accuracy up to 0.1%. Two different equivalent solutions (by DU parameter) have been obtained, and tangibly different values of IP and EM fields correspond to each.

Figure 2:
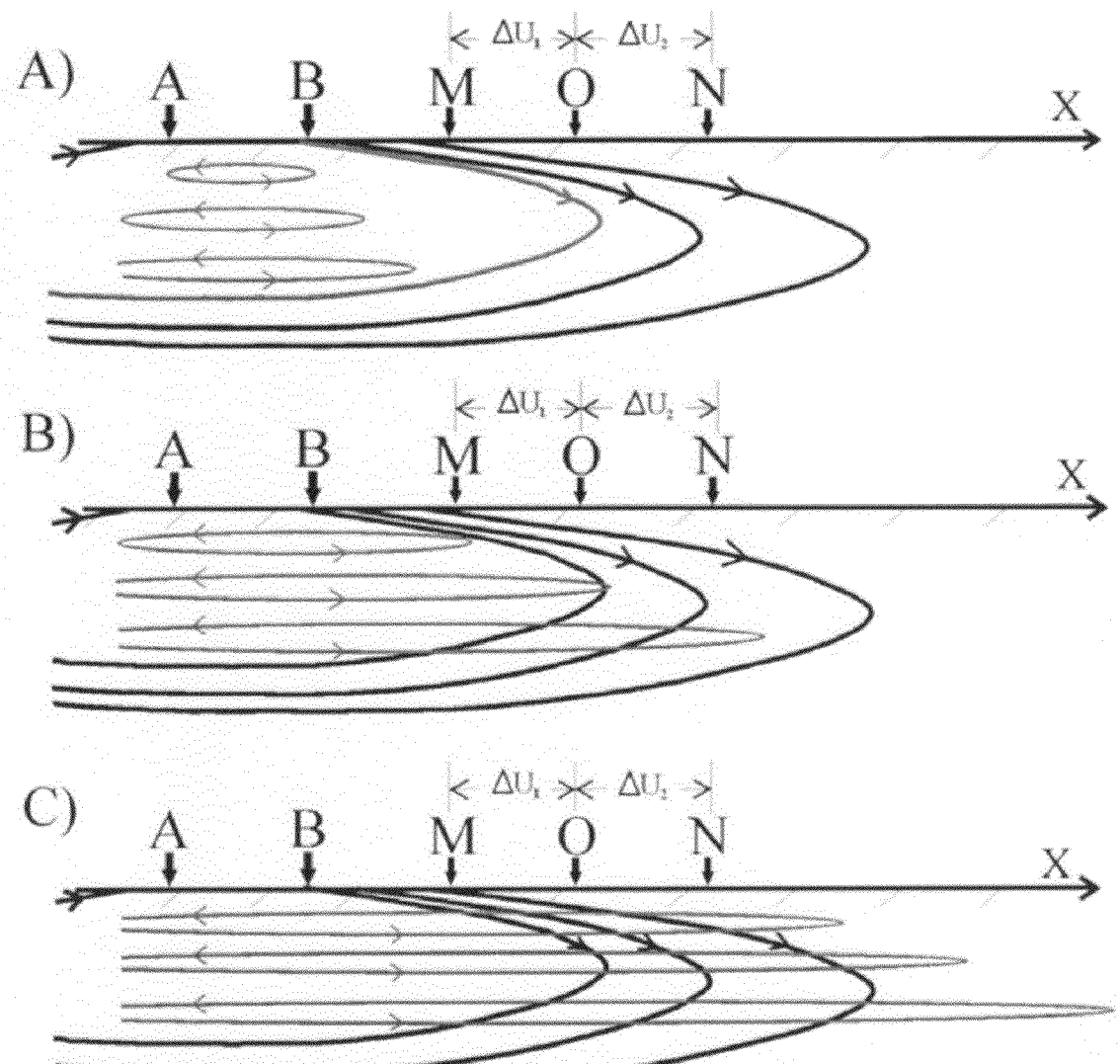

FIG. 2 shows an interval of EM and IP currents distribution on different steps (phases) of transient: the early one A), the interim (transition) one B) and the late one C).

Thereby during transient the electromagnetic induction EM field diffuses into the lower semispace following the skin effect, and inducing it eddy currents tend to a uniform distribution in the lower semispace; on the opposite, the IP field always stays spatially inhomogeneous and decreases when moving away from the source of current, i.e. from an emitter.

Basing on the purpose of the set task, it is required to consider the transient field transforms that would be recorded in the same point and had different functional dependence on induced polarization and electromagnetic induction fields. The most natural decision is an introduction of normalized spatial derivatives of the transient fields (more precisely, their finite differences) in addition to the transient fields themselves, since space-time structures of EM and IP fields are different.

Figure 3:
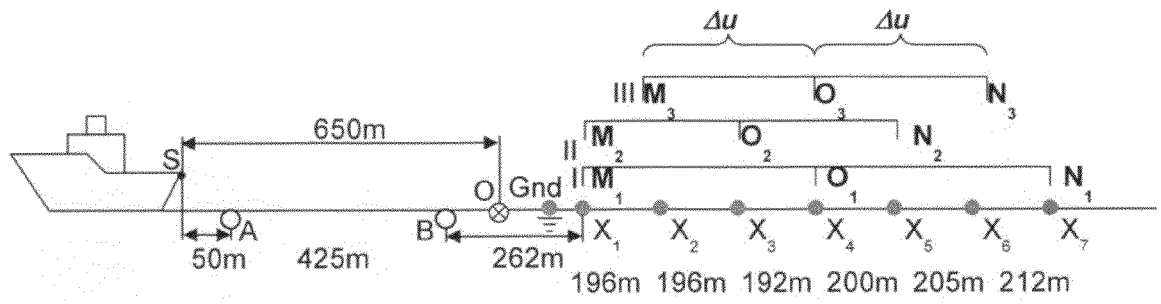
Figure 3:
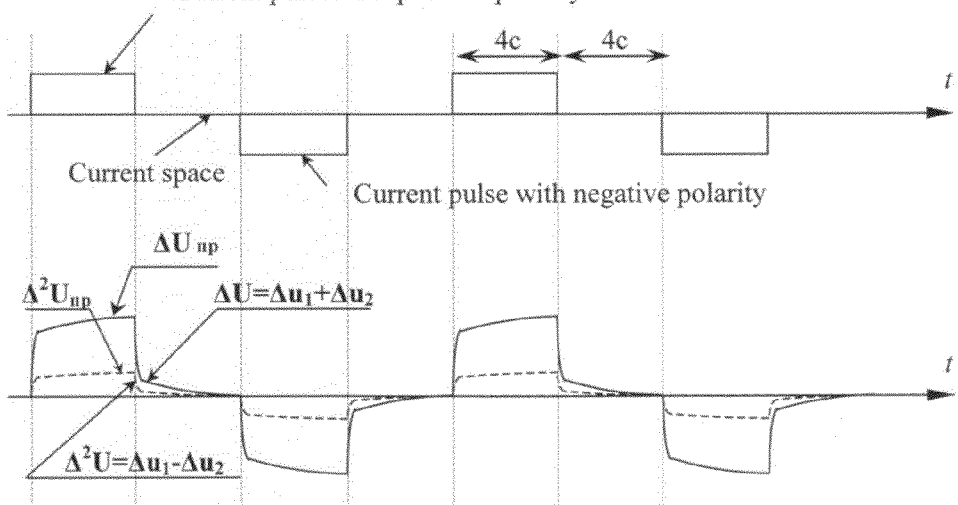

FIG. 3 shows: a) scheme of a measuring apparatus logging the parameters $DU(t)$, $P1(t)$, $Ps(t)$, $D\phi(t)$ during a vessel movement; b) current waveform in generator line AB to initiate transient; c) measured signals $\Delta 2U(t)$ and $\Delta U(t)$ on a detector line.

Figure 4:
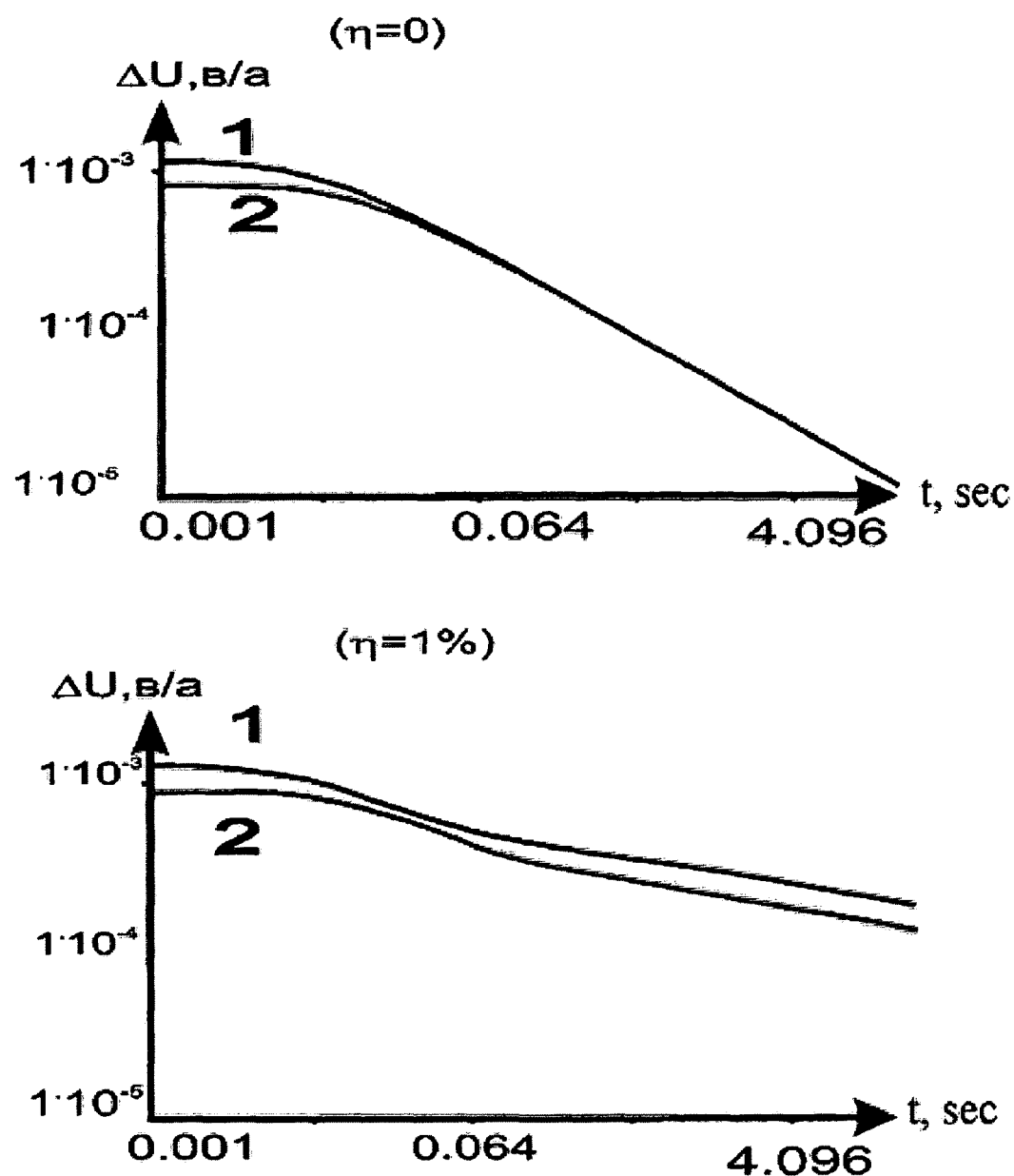

FIG. 4 shows a curve $DU(t)$ fading in time above the earth surface in the presence of polarization (B) and in its absence (A), on the detector line MO (at the distance of 1000 m (1)) and detector line ON (at the distance of 2400 m (2)).

Figure 5:
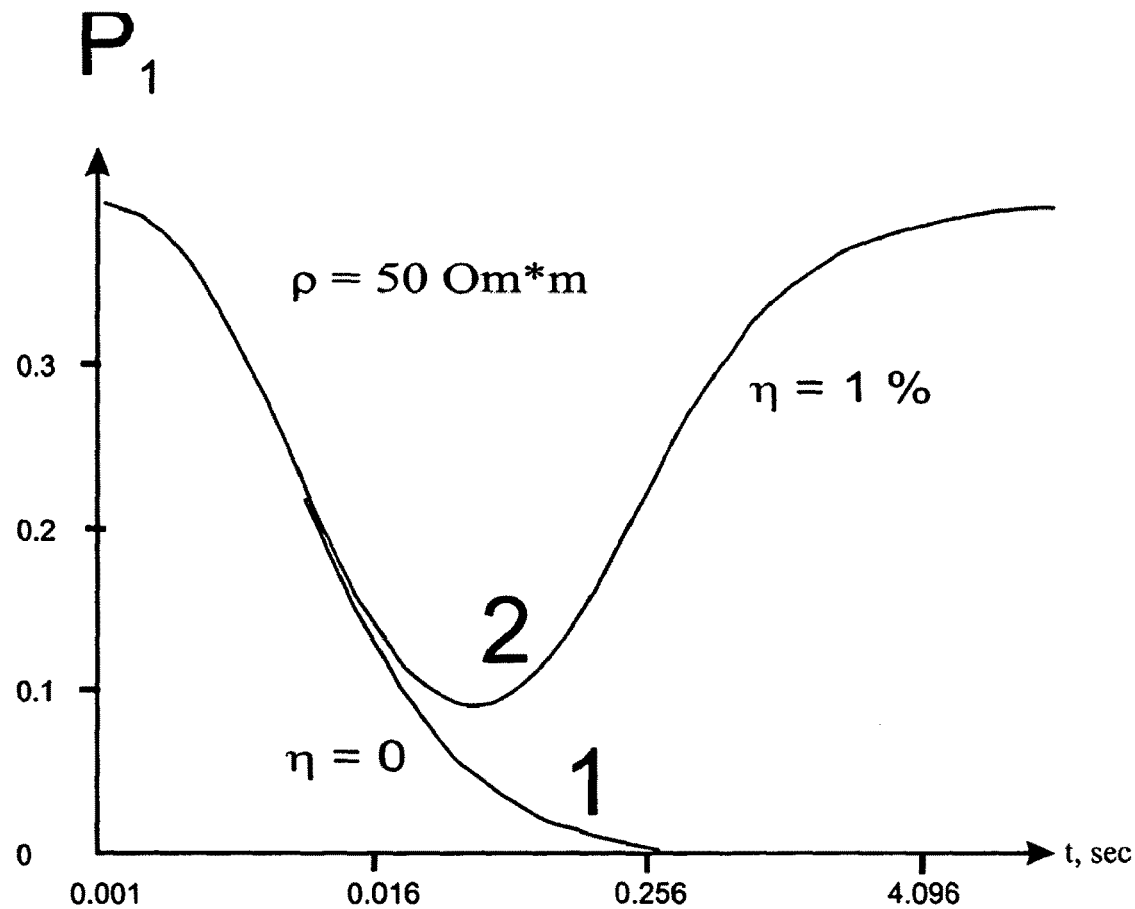

FIG. 5 shows a parameter $P1(t)$ curve above the earth surface in the presence of polarization (2) and in its absence (1), with $\eta=1\%$ and $\rho=50$ Ohm·m, and $\eta=0\%$.

Figure 6:
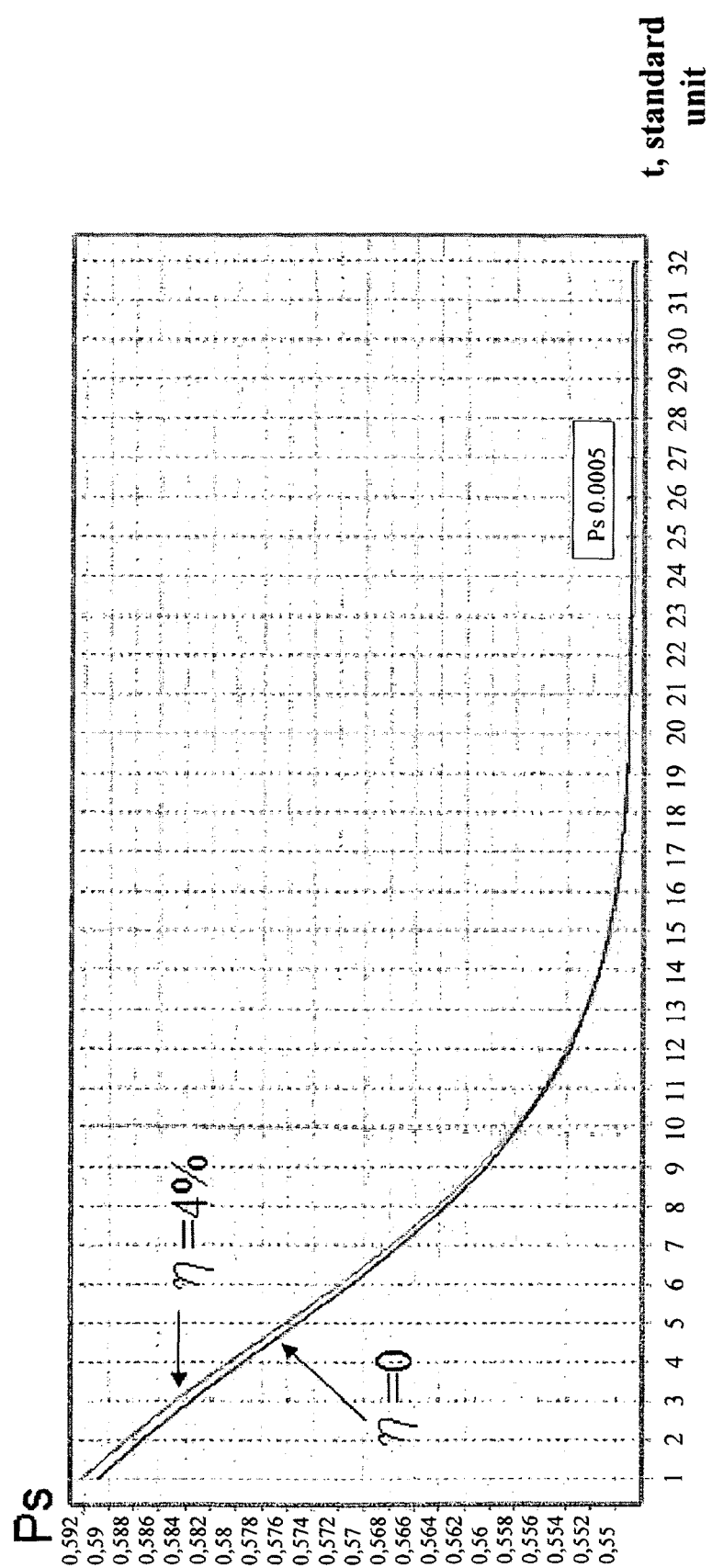

FIG. 6 shows a parameter Ps curve above the earth surface, relatively, with $\eta=4\%$ and $\eta=0$, where $\eta$ is a polarizability factor in terms of Cole-Cole model.

Figure 7:
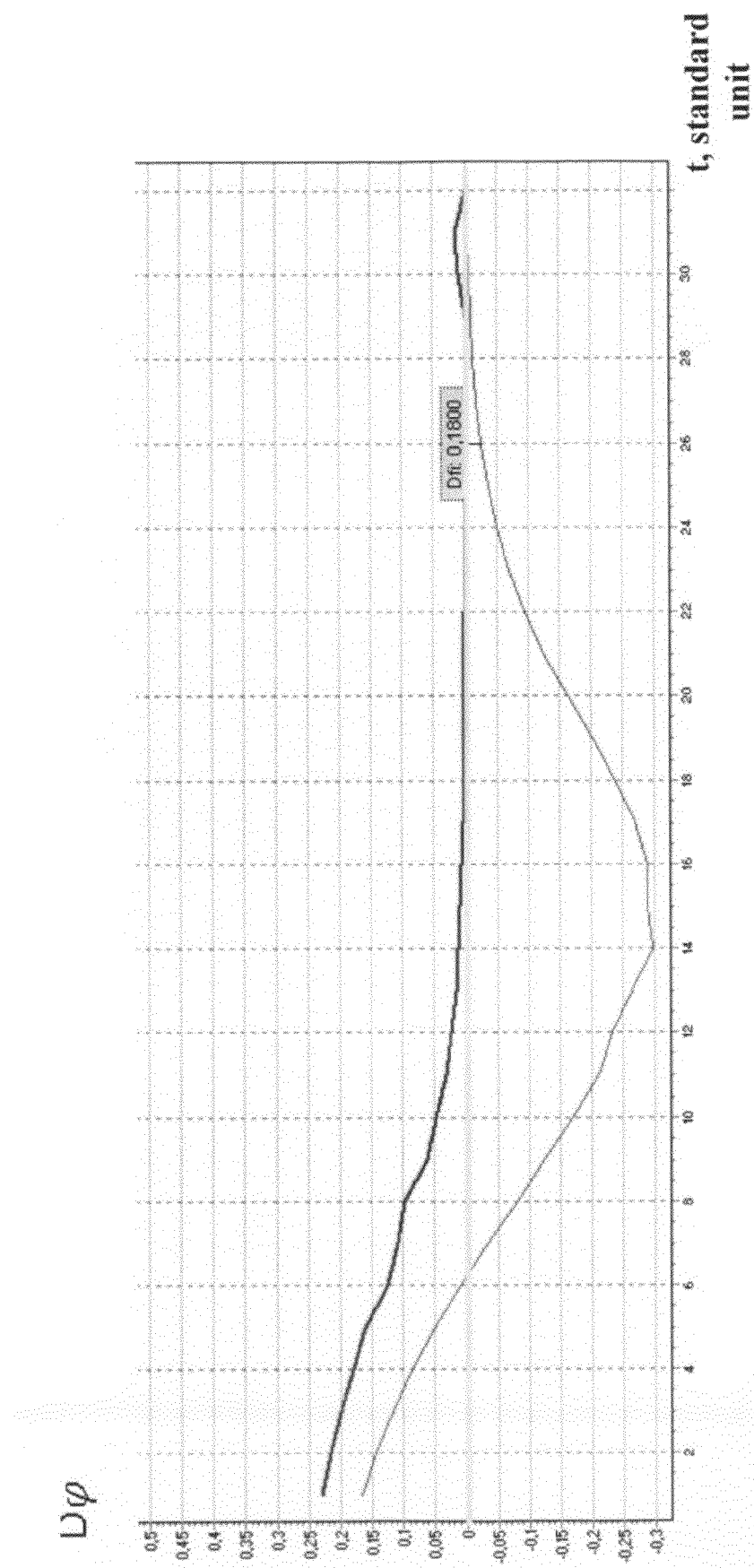

FIG. 7 shows a curve $D\phi$, calculated with $\eta=0$ and $\eta=1\%$, where $\eta$ is a polarizability factor in terms of Cole-Cole model. The curves are plotted relative to a zero line $D\phi$. Applying of time derivatives along with spatial characteristics permits an advanced description of transients.

Figure 8A:
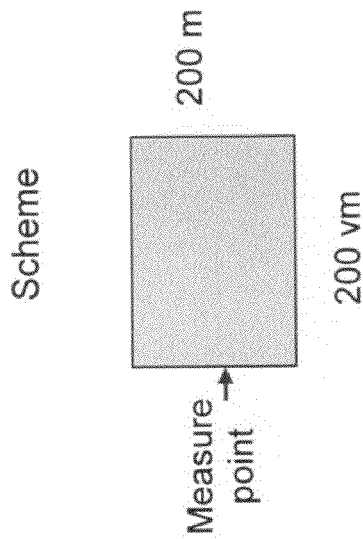
Figure 8B:
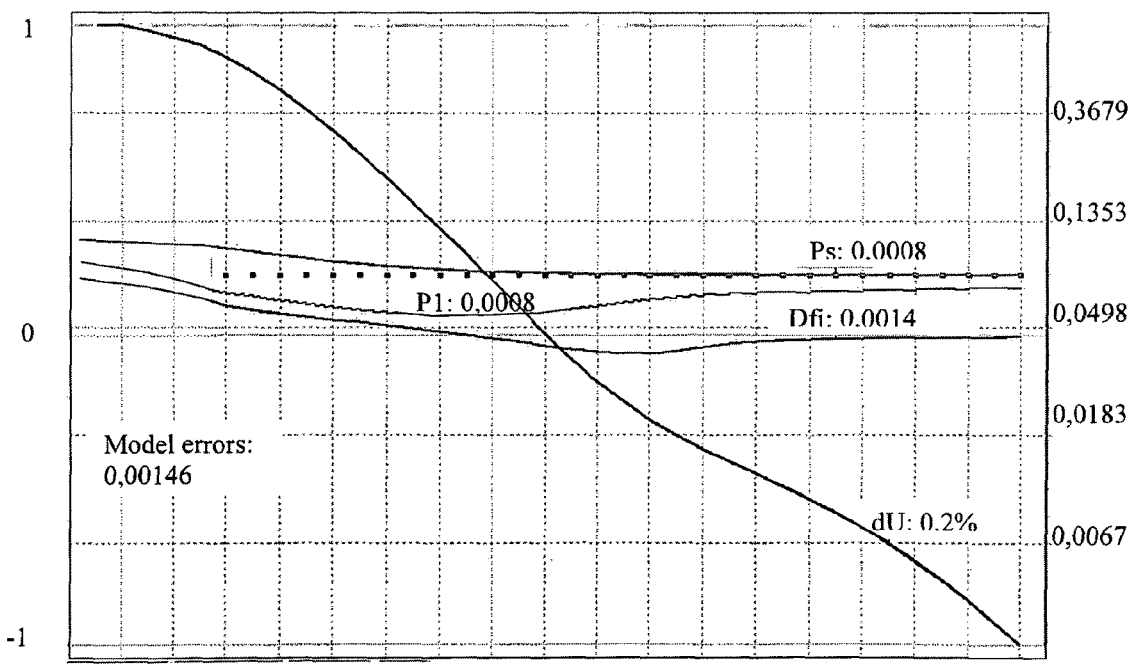

FIG. 8 shows a three-dimensional reference model that served the ground for plotting of parameters synthetic curves corresponding to those plotted basing on field observations (DU(t), P1(t), Ps(t), Dφ(t)), and to values of EM and IP fields. An equivalent one-dimensional model is also shown.

Figure 9:
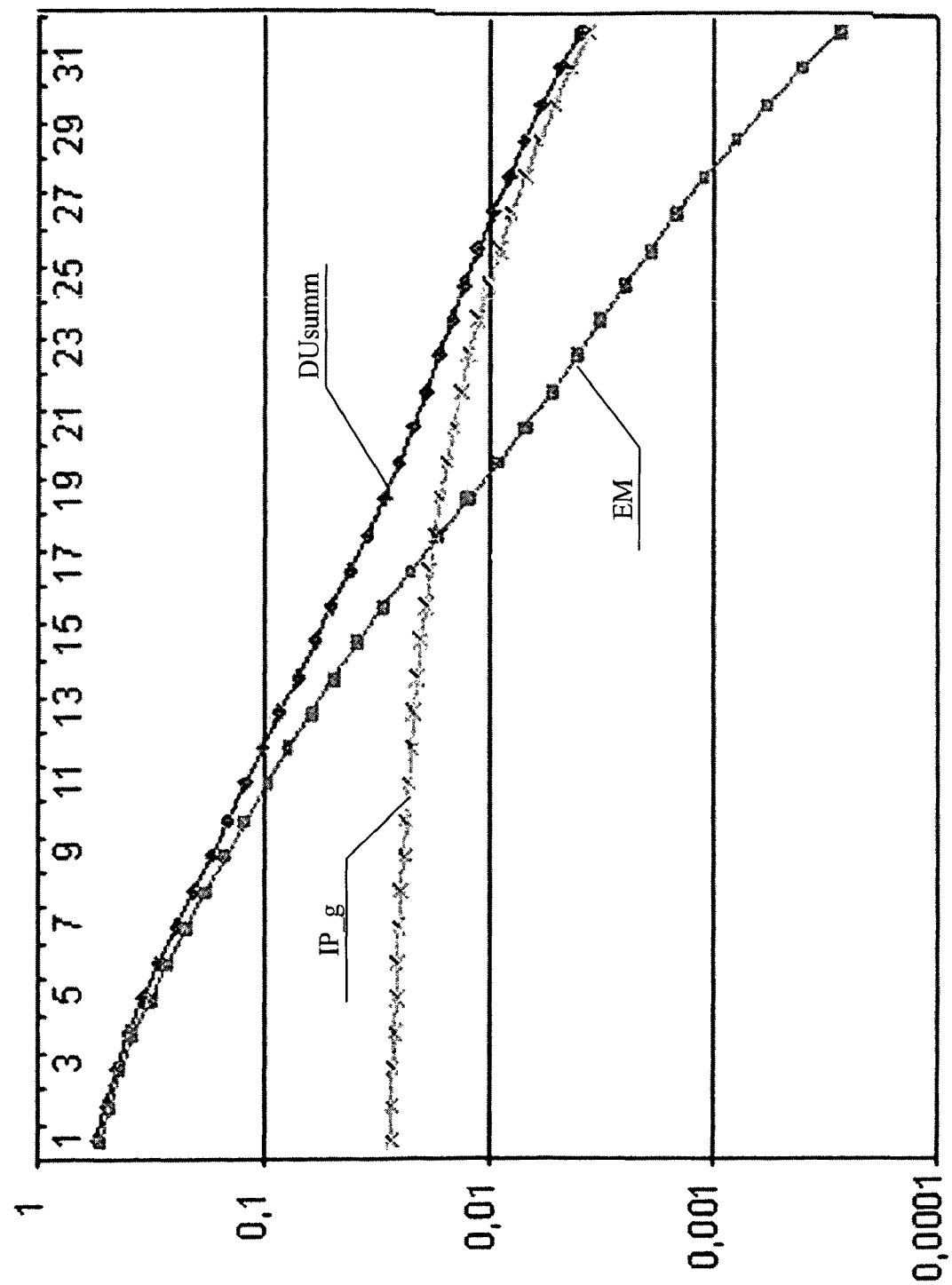

FIG. 9 shows EM and IP fields coincided to 0.15% for the models of FIG. 8.

Figure 10:
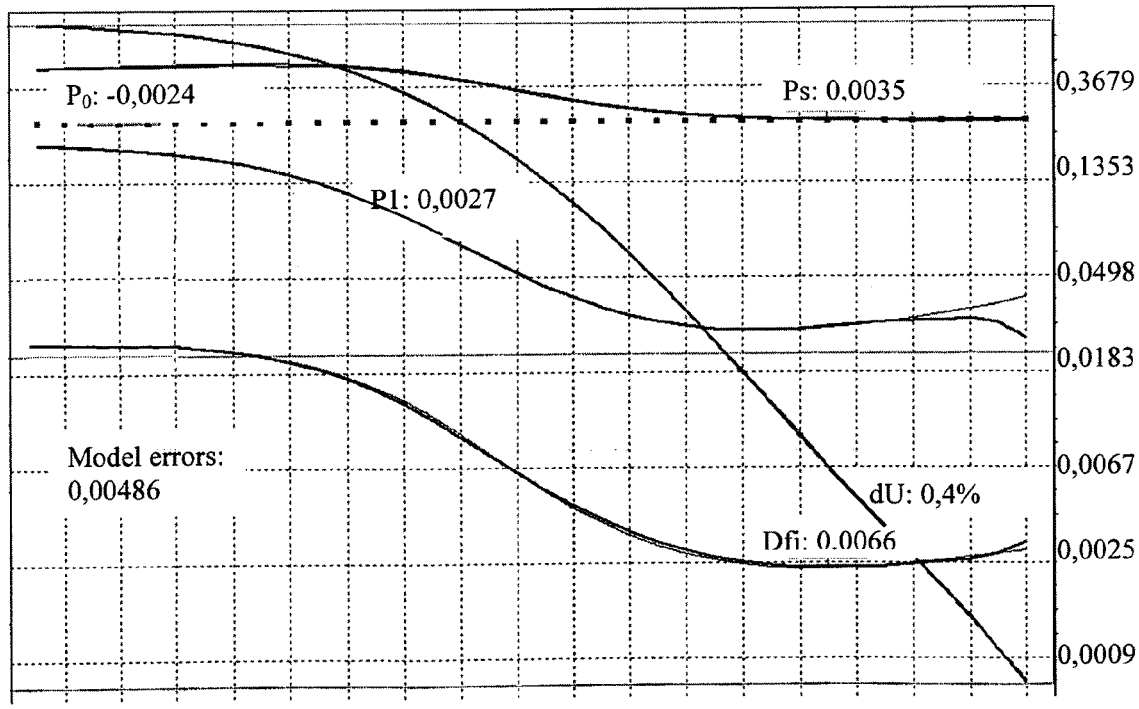

FIG. 10 shows curves plotted basing on the field observations at Northern Gulyaevskaya area (the Barents Sea shelf) and corresponding model curves. One of equivalent geoelectrical models is also shown.

Figure 11:
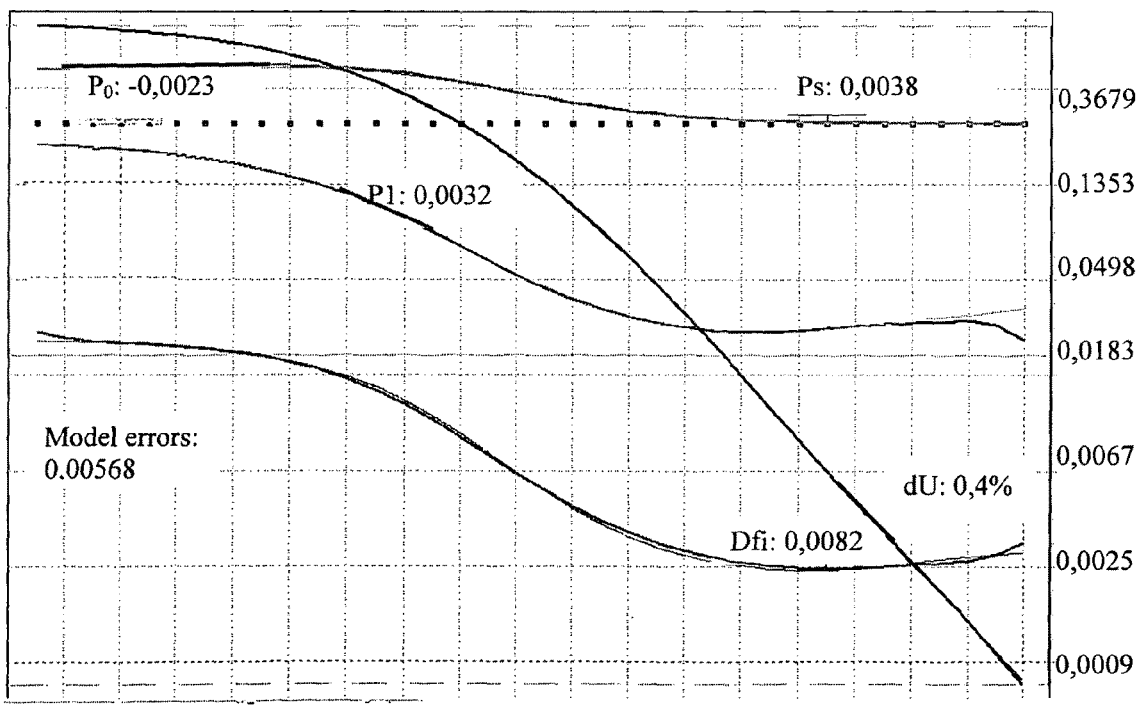

FIG. 11 shows curves plotted basing on the field observations at Northern Gulyaevskaya area (the Barents Sea shelf) and corresponding model curves. One of equivalent geoelectrical models, different from the one shown in FIG. 10, is also shown.

Figure 12:
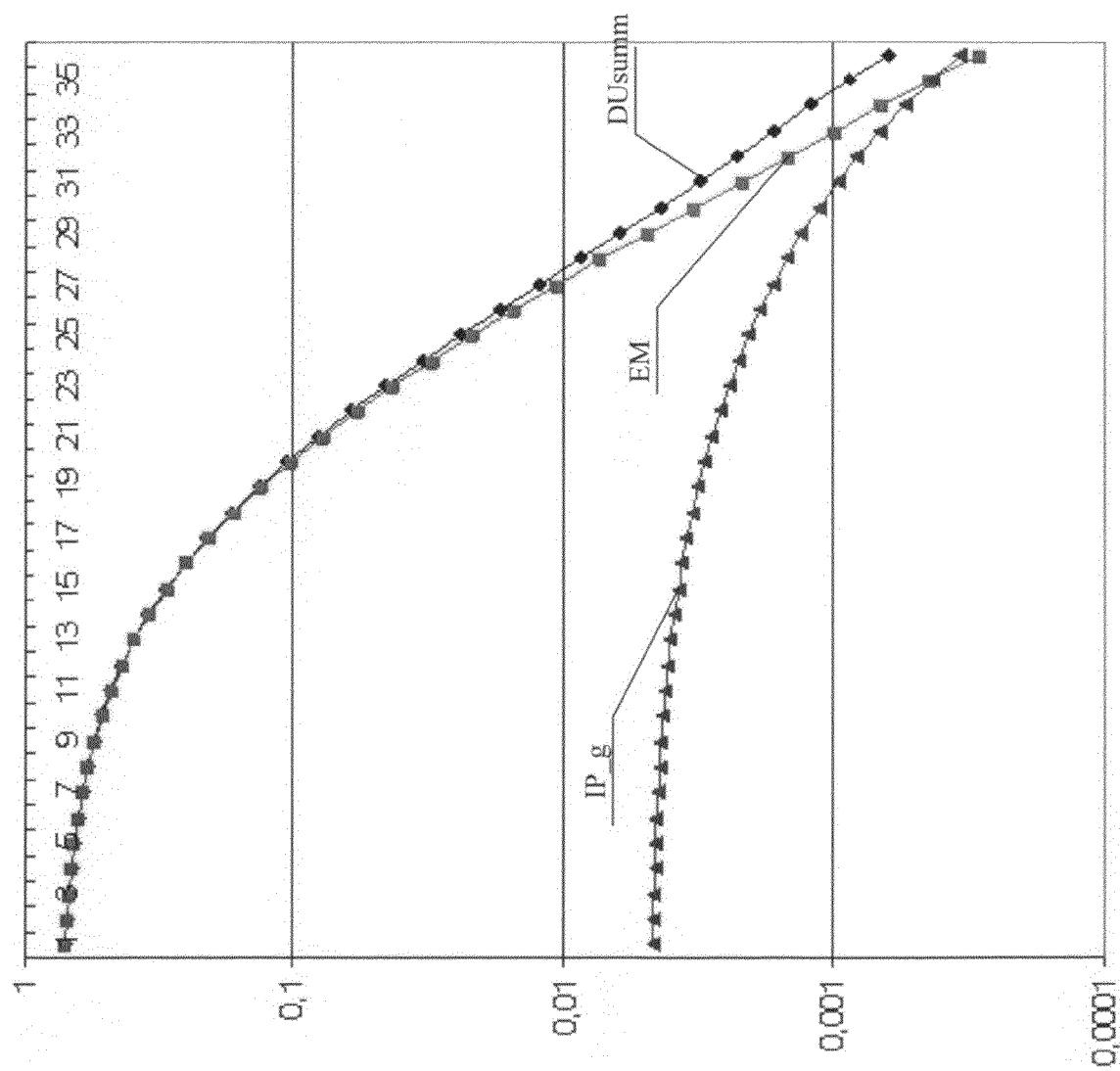

FIG. 12 shows the curves of EM and IP fields drops, based on equivalent models and different in the value lesser than measurement error making 0.5%. The IP field stands out within wide time span against the level of the EM field that is 2 orders higher.

Figure 13:
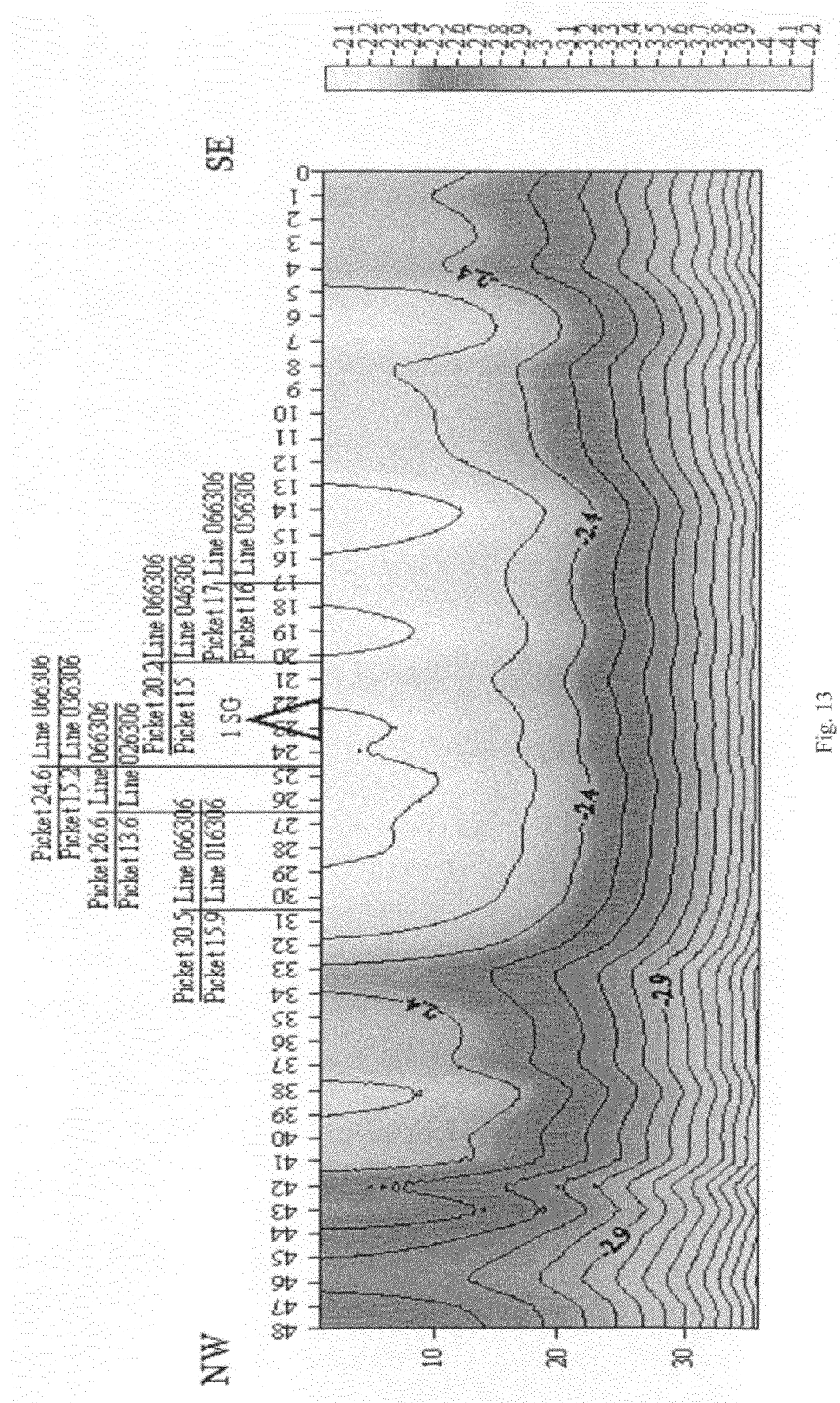

FIG. 13 shows the induced polarization field isolines along a section above an onstream field, and an oil and gas reservoir delimitation basing on the induced polarization field.

DETAILED DESCRIPTION OF THE INVENTION

The method is executed as follows.

A set of input data obtained in the result of the earth surface measurements is provided. The data are formed in the way that ensures different functional relationship of induced polarization and electromagnetic induction for all data. Basing on these data, by means of inversion, a geoelectrical model is obtained under a condition of deliberately redundant number of the section parameters that characterize the induced polarization processes.

If the induced polarization IP field is determined for this model as a result of solving the direct problem with set to nil wave numbers, and the electromagnetic induction EM field is determined as a result of solving the direct problem with set to nil polarizability, then a condition of the IP and EM fields reproducibility is observed. It means that discrepancies obtained during the IP and EM fields calculation above different equivalent models do not exceed the actual observation error (about 0.5%).

For the method realization:

1. Parameter P1 (see FIG. 1) is formed during a measuring under a cut-off current pulse condition:
    taking it as a filter that increases the induced polarization and electrodynamics ratio as compared to $\Delta U(t)$,
    determining P1, for this purpose, as the ratio of the second axial potential difference $\Delta 2U$ of the transient field and the first axial potential difference $\Delta U$ of the transient field under a cut-off current condition,
    i.e. $P1(t)=\Delta 2U(t)/\Delta U(t)$.

Figure 1:
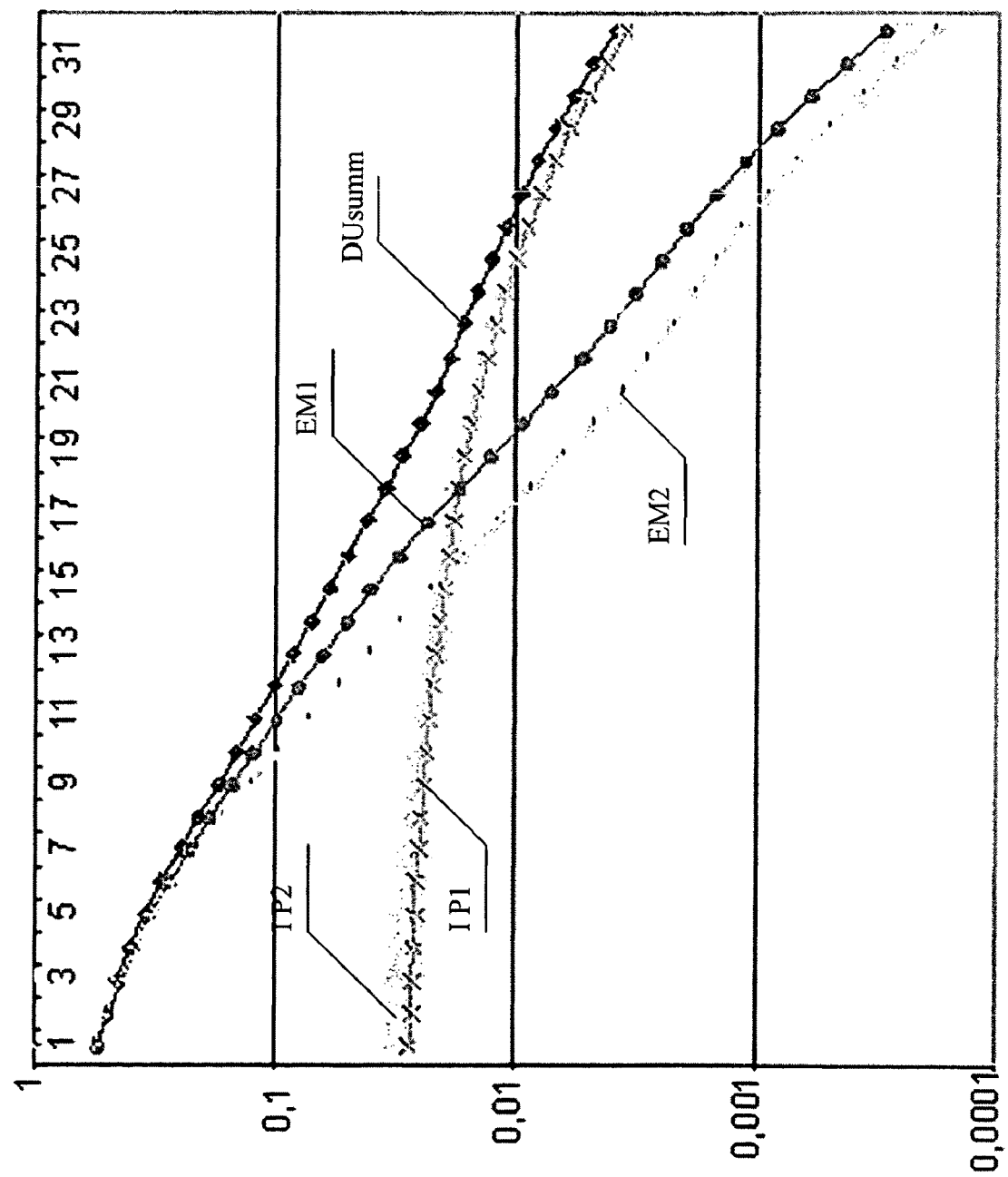
FIG. 1 shows graphs of $\Delta U_1$ and $\Delta U_2$, representing a potential difference on detector lines OM and ON of an axial dipole array.

FIG. 1 shows $\Delta U_1$ and $\Delta U_2$, representing potential differences on the detector lines OM and ON of the axial dipole array. Parameter P1 responds to a spatial inhomogeneity of the transient field. The electromagnetic currents field is described by a diffusion equation hence it tends to a uniform distribution within the medium when decay time increases. The induced polarization field is proportional to a polarizing current density, hence it is always spatially inhomogeneous (see FIG. 2) [see P. Yu. Legeido "The Theory and Technologies of Differentially Normalized Geoelectric Prospecting for Investigating Polarizable Sections in Oil and Gas Geophysics." A Thesis for a Doctoral Degree in Geology and Mineralogy, Irkutsk, 1998]. Thereby, parameter $P_1$ can be considered as a filter that increases the induced polarization and electrodynamics ratio as compared to the transient field $\Delta U$ (see FIGS. 4 and 5).

2. Parameter Ps is formed during a measuring under a switched on current pulse condition:
    taking it as a filter that decreases the induced polarization and electrodynamics ratio as compared to $\Delta U(t)$,
    defining, for this purpose, the ratio of the second axial potential difference $\Delta 2U$ of the transient field and the first axial potential difference $\Delta U$ of the transient field under a switched on current condition.

The induced polarization and electrodynamics ratio is low at the early step of transient, though at the late stage parameter Ps is mainly determined by resistances distribution, and polarizability has a weak influence upon it. Hence, parameter Ps can be considered as a filter that decreases the induced polarization and electrodynamics ratio as compared to the transient field $\Delta U$ (see FIG. 6).

3. Parameter Dφ is formed to provide a detailed transient description, since it is calculated basing on the time derivatives $\Delta 2U(t)$ and $\Delta U(t)$,
    this parameter represents a difference of parameters It and P1 relative to arbitrary units (a logarithm of transient time), i.e. $D\phi = It - P1$,
    wherein parameter It is calculated as $It=\Delta t(\Delta 2U)/\Delta t(\Delta U)$, i.e. as the ratio of the time derivatives $\Delta 2U(t)$ and $\Delta U(t)$.

The decay rates for the induced polarization and electromagnetic induction fields are normally different hence it is reasonable to apply time derivatives to provide more detailed description of the transients (see FIG. 7).

4. Minimization of the parameters obtained in the same measure point is performed,
    for this purpose the parameters are passed to the minimization program entry (see FIG. 3):
    $DU(t)=\Delta U(t)/\Delta U_0$, where $\Delta U_0$ is a potential difference $\Delta U$ measured during current passing,
    $P1(t)=\Delta 2U/\Delta U(t)$ calculated under a cut-off current condition,
    $Ps(t)=\Delta 2U/\Delta U(t)$ calculated under a switched on current condition,
    $D\phi(t)=It-P1$, where $It=\Delta t(\Delta 2U)/\Delta t(\Delta U)$,
        followed by performing of their inversion within a horizontally stratified polarizable medium under conditions of deliberately redundant number of the model geoelectrical parameters, in order to approximate the curves plotted during field measurements above an inhomogeneous anisotropic and gradient medium as close as possible.

5. Calculation of the IP and EM fields basing on the obtained medium model is performed under conditions as follows:
    the polarizability is set to nil for all medium areas within the obtained model and through solving of the direct problem the electromagnetic induction field is calculated;
    the wave numbers are set to nil for all medium areas within the same model and through solving of the direct problem the induced polarization field is calculated.

6. Verification of the solution reproducibility is performed:
    verification of the IP and EM fields reproducibility proves that practically for all types of sections they are reproduced with an error not exceeding a measurement error (i.e. about 0.5%) (see FIGS. 10 and 13).

The method of separating of the electromagnetic induction and polarization fields can be illustrated with the help of the following example.

For a three-dimensional model the parameter synthetic curves corresponding to curves plotted at field measurements has been plotted, and the EM and IP fields have been calculated (see FIG. 8).

An equivalent model within a horizontally stratified polarizable medium has been found for the synthetic curves, and the EM and IP fields have been calculated basing on this model (see FIG. 8).

The fields obtained basing on the three-dimensional and the horizontally stratified models have been compared (see FIG. 9). The discovered error (0.15%) does not exceed the error of discrepancy between the synthetic curves plotted for the three-dimensional model and the model curves plotted for the horizontally stratified medium. By virtue of small discrepancy the difference on the graphs is not visually detectable.

The method of quantitative separation of electromagnetic induction and induced polarization effects has been tested in practice in most various geological and geophysical conditions.

Electric exploration works comprising measuring of parameters DU(t), P1(t), Ps(t), Dφ(t) have been performed at the onstream oil and gas field at Northern Gulyaevskaya area (the Barents Sea shelf). Horizontally stratified polarizable models have been obtained for the curves plotted at the field measurements with approximation error not exceeding 0.5% (see FIGS. 11 and 12). Furthermore, a few equivalent models have been obtained for the same survey stake, and calculated graphs of the EM and IP fields have shown discrepancy not exceeding 0.5% (see FIG. 13). At that an IP field that is two orders below the EM field has been distinguished. Plotting isolines of the IP field has resulted in clear delimitation of an oil and gas reservoir (see FIG. 14).

Herein:
Ro is a resistance, Ohm·m;
C is an index of power in Cole-Cole model;
H is a layer thickness, m;
η is a polarizability factor for Cole-Cole model, %;
t is a relaxation time for Cole-Cole model, s.

For instance, for a model with the following parameters:
Ro=10 Ohm m, Eta=5%, Tau=0.5 s, C=0.5, H=100 m
Ro=50 Ohm m, Eta=2%, Tau=0.5 s, C=0.5, H=100 m
Ro=20 Ohm m, Eta=2%, Tau=1 s, C=0.5, H=200 m
Ro=5 Ohm m, Eta=5%, Tau=1 s, C=0.5, H=300 m
Ro=200 Ohm m, Eta=7%, Tau=1 s, C=0.5
Ro=500 Ohm m, Eta=0, H=450 m
Ro=5 Ohm m, Eta=0, H=800 m
Ro=1000 Ohm m, Eta=0, H=∞

Basing on this model the values of input data corresponding to those obtained during field measurements, as well as the induced polarization and electromagnetic induction fields have been calculated and a graph for Northern Gulyaevskaya area at the Barents Sea shelf has been plotted, see FIG. 13.

In other words, basing on the purpose of the set problem the transient field transforms, that would have been recorded in the same point and shown different functional dependence on the induced polarization and electromagnetic induction fields, have been introduced and considered. At the same time, the normalized spatial derivatives of the transient fields (more precisely, the finite differences) in addition to the transient fields themselves have been introduced since the space-time structures of electromagnetic induction fields and induced polarization fields are different. Thus, the claimed technical result has been obtained.

The invention claimed is:

1. A method for quantitative separation of electromagnetic induction and induced polarization effects, comprising: measuring of the process of transient over a polarizable medium, modeling of electromagnetic measurements within a horizontally stratified polarizable medium, segregating of an electrodynamic component from transient process, segregating of a galvanic component of induced polarization from transient process, evaluating of changes of the induced polarization galvanic component by area and its geological interpretation, characterized in
setting of several input functions dependent on medium parameters and measured on the medium surface, forming of these functions in the way that ensures different manner of their dependence on the electromagnetic induction field and induced polarization field, wherein one of these functions is made to increase an electromagnetic induction and induced polarization ratio as compared to DU(t), the second of these functions is made to decrease the electromagnetic induction and induced polarization ratio as compared to DU(t), and the third of these functions is made as a combination of time and spatial derivatives of the transient field, and further in simultaneous inversion of all the input functions and obtaining of a geoelectrical model of the section, meanwhile the number of the medium parameters which characterize induced polarization is deliberately redundant, so that the obtained medium model is not single, but lies within a certain range of equivalence, then the obtained model polarizability is set to nil for all layers, and through solving the direct problem the electromagnetic induction field (EM) is calculated, simultaneously the wave numbers of the said model are set to nil, and through solving the direct problem the field of the induced polarization (IP) galvanic component is calculated.

2. The method for quantitative separation of effects according to claim 1, characterized in that the several input functions are formed, where one of the functions is Ps, calculated to increase the electromagnetic induction and induced polarization ratio as compared to DU(t), the second is $P_1$, calculated to decrease the electromagnetic induction and induced polarization ratio as compared to DU(t), and the third is Dφ, calculated as a combination of time and spatial derivatives of the transient field.

3. The method for quantitative separation of effects according to claim 1, characterized in that the parameter $P_1$ is formed as a filter that increases the induced polarization and electrodynamics ratio as compared to AU(t), the said parameter $P_1$ is defined as a ratio of the second axial potential difference of the transient field Δ2U(t) and first axial potential difference of the transient field ΔU(t) under a condition of current cut-off according to the equation $P1(t)=\Delta 2U(t)/\Delta U(t)|_{time\ off}$.

4. The method for quantitative separation of effects according to claim 1, characterized in that the parameter Ps is formed as a filter that decreases the induced polarization and electrodynamics ratio as compared to ΔU(t), the said parameter Ps is defined as a ratio of the second axial potential difference of the transient field Δ2U(t) and first axial potential difference of the transient field ΔU(t) under a condition of current switched on according to the equation $Ps(t)=\Delta 2U(t)/\Delta U(t)|_{time\ on}$.

5. The method for quantitative separation of effects according to claim 1, characterized in that the parameter Dφ(t) is formed as a difference of parameters $I_t(t)$ and $P_1(t)$ according to the equation Dφ(t)=It(t)−$P_1$(t), where the $I_t$(t) is calculated according to the equation $I_t(t)=\Delta_t(\Delta^2U(t))/\Delta_t(\Delta U(t))$ as a ratio of the time derivatives Δ2U(t) and ΔU(t).

6. The method for quantitative separation of effects according to claim 1, characterized in that the simultaneous minimization of the input parameters determined at the same measure point is performed through inputting the following parameters to a minimization program:
DU(t)=ΔU(t)/ΔU$_0$, where ΔU$_0$ is a potential difference ΔU measured during a current passing, $P_1(t)=\Delta^2 U(t)/\Delta U(t)$, calculated under a cut-off current condition, $Ps(t)=\Delta^2 U(t)/\Delta U(t)$, calculated under a switched on current condition, $D\phi(t)=I_t(t)-P_1(t)$, where $I_t(t)=\Delta_t(\Delta^2 U(t))/\Delta_t(\Delta U(t))$, and performing their inversion within a horizontally stratified polarizable medium under conditions of the deliberately redundant number of the model geoelectrical parameters describing its polarization properties.

7. The method for quantitative separation of effects according to claim 1, characterized in that the induced polarization field IP is determined as a result of solving the direct problem of the model obtained after its minimization with the wave numbers set to nil.

8. The method for quantitative separation of effects according to claim 1, characterized in that the electromagnetic induction field EM is determined as a result of solving the direct problem of the model obtained after its minimization with polarizability set to nil.

9. The method for quantitative separation of effects according to claim 1, characterized in that verification of reproducibility of the solution is performed.

* * * * *